United States Patent
Yacine

(10) Patent No.: US 8,544,594 B2
(45) Date of Patent: Oct. 1, 2013

(54) COUPLING STRUCTURE FOR RESONANT GYROSCOPE

(75) Inventor: Karim Yacine, Montigny Le Bretonneux (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 13/319,581

(22) PCT Filed: May 12, 2010

(86) PCT No.: PCT/EP2010/056514
§ 371 (c)(1), (2), (4) Date: Nov. 15, 2011

(87) PCT Pub. No.: WO2010/130765
PCT Pub. Date: Nov. 18, 2010

(65) Prior Publication Data
US 2012/0061172 A1    Mar. 15, 2012

(30) Foreign Application Priority Data

May 15, 2009   (FR) ...................... 09 53228

(51) Int. Cl.
| | | |
|---|---|---|
| G01V 1/04 | (2006.01) | |
| G01V 1/02 | (2006.01) | |
| G01V 1/06 | (2006.01) | |
| G01C 19/00 | (2006.01) | |

(52) U.S. Cl.
USPC ............ 181/121; 73/504.12; 73/504.16; 181/113; 181/118

(58) Field of Classification Search
USPC ............ 181/121; 73/504.12, 504.16
See application file for complete search history.

(56) References Cited

U.S. PATENT DOCUMENTS

| | | | | | |
|---|---|---|---|---|---|
| 5,763,781 | A | * | 6/1998 | Netzer | 73/504.16 |
| 5,834,646 | A | * | 11/1998 | Kvisteroy et al. | 73/514.29 |
| 5,895,850 | A | * | 4/1999 | Buestgens | 73/504.12 |
| 6,089,088 | A | * | 7/2000 | Charvet | 73/504.12 |
| 6,134,961 | A | * | 10/2000 | Touge et al. | 73/504.12 |
| 6,349,597 | B1 | * | 2/2002 | Folkmer et al. | 73/504.02 |
| 6,651,498 | B1 | * | 11/2003 | Kikuchi et al. | 73/504.12 |
| 6,955,084 | B2 | * | 10/2005 | Challoner et al. | 73/504.16 |
| 7,036,372 | B2 | * | 5/2006 | Chojnacki et al. | 73/504.12 |
| 7,360,423 | B2 | * | 4/2008 | Ayazi et al. | 73/504.12 |
| 7,926,614 | B2 | * | 4/2011 | Tenghamn et al. | 181/121 |
| 8,176,779 | B2 | * | 5/2012 | Blomqvist | 73/504.12 |

(Continued)

OTHER PUBLICATIONS

International Search Report Issued Jun. 29, 2010 in PCT/EP10/056514 Filed May 12, 2010.

*Primary Examiner* — David Warren
*Assistant Examiner* — Christina Russell
(74) *Attorney, Agent, or Firm* — Oblon, Spivak, McClelland, Maier & Neustadt, L.L.P.

(57) ABSTRACT

A coupling structure for a resonant microgyroscope produced on a substrate, wherein the coupling structure enables a vibratory movement provided by an excitation mechanism to be detected along a first axis, and enables it to be transmitted to seismic masses lying in a plane containing the first axis. The coupling structure includes a closed assembly of beams connected to the seismic masses so as to be anchored only to the seismic masses, wherein the assembly is positioned to detect the vibratory movement provided by the excitation mechanism, and to transmit it to the seismic masses along at least a second axis contained in the plane, wherein the coupling structure has no point of anchorage to the substrate.

10 Claims, 8 Drawing Sheets

(56) References Cited

U.S. PATENT DOCUMENTS

Figure 1C:
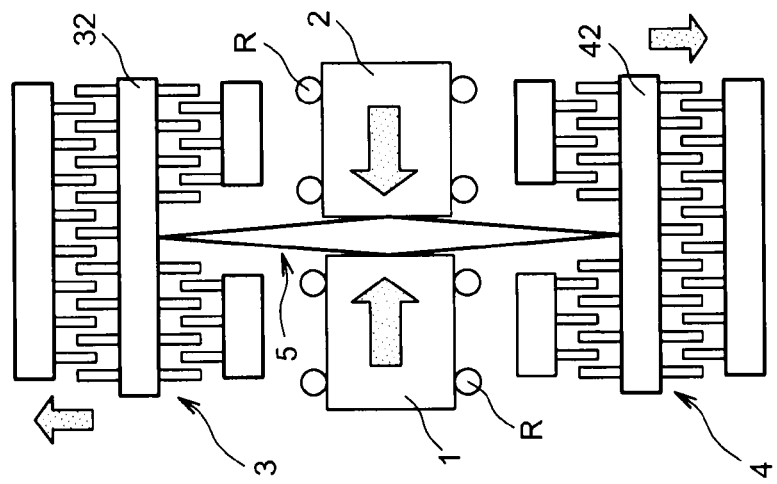

| | | | |
|---|---|---|---|
| 8,187,902 B2* | 5/2012 | Weinberg et al. | 438/50 |
| 2004/0154397 A1* | 8/2004 | Platt et al. | 73/504.12 |
| 2005/0072231 A1* | 4/2005 | Chojnacki et al. | 73/504.14 |
| 2005/0210978 A1* | 9/2005 | Lang et al. | 73/504.12 |
| 2007/0013464 A1* | 1/2007 | Pan et al. | 333/200 |
| 2008/0041155 A1* | 2/2008 | Pan et al. | 73/504.16 |
| 2008/0276706 A1* | 11/2008 | Hartmann et al. | 73/504.04 |
| 2009/0031806 A1* | 2/2009 | Hartmann et al. | 73/504.12 |
| 2009/0056443 A1* | 3/2009 | Netzer | 73/504.12 |
| 2009/0249873 A1* | 10/2009 | Delevoye | 73/504.12 |
| 2010/0122577 A1* | 5/2010 | Neul et al. | 73/504.12 |
| 2011/0100121 A1* | 5/2011 | Wyse et al. | 73/504.12 |
| 2012/0279301 A1* | 11/2012 | Gunthner et al. | 73/504.12 |

* cited by examiner

COUPLING STRUCTURE FOR RESONANT GYROSCOPE

TECHNICAL FIELD

The present invention relates to an inertial sensor intended to measure angular speed in two axes in the plane (or more). This is a gyroscope, and more specifically a microgyroscope.

STATE OF THE PRIOR ART

Gyroscopes have many uses: in motor vehicles, aeronautics, robotics, etc.

As with every product used in the mass retail field such as motor vehicles, in which cost is a major element, mass manufacture of such microelectronic technology components becomes very attractive.

The production of silicon microgyroscopes is already widespread. This type of component typically includes 2 moving masses coupled in antiphase, vibrating in the plane at resonance. The masses are excited by means of electrostatic or piezoelectric forces applied through interdigital comb structures or a piezoelectric actuator.

If it is accepted that the masses vibrate in axis x, when the gyroscope rotates at a certain angular speed around axis y (orthogonal to axis x), the composition of the forced vibration with the angular speed induces forces (Coriolis forces) which impart vibration in z to the moving masses. The vibration is then detected by capacitive means by electrodes positioned above the moving masses, and enables the value of the rotational speed around axis y to be derived. The advantage of having an antiphase mass coupling is that it allows differentiation between the effect of translational acceleration in axes y or z, and the Coriolis effect generated by a rotation in y or z, since the first causes a phase movement of the masses, and the second generates an antiphase movement of the masses, in the y or z detection directions.

This state of the art is broken down into two parts:
  application to a 1-axis gyroscope, in which there is, in principle, no gyroscope system in which it is possible to generate a natural (existing) antiphase, and where simultaneously the amplitude of displacement of the masses can be adjusted independently of the displacement imposed in the actuation area;
  application to a 2-3-6 axis gyroscope for which there are no comparable means allowing the excitation movement of 4 masses forming two gyroscopes which are perfectly coupled in phase and amplitude of displacement in excitation mode to be coupled mechanically in amplitude and in antiphase.

The literature covering 1-axis gyroscopes is very dense. There are, notably, many patents concerning generation of couplings between masses in detection mode and in excitation mode. Couplings which are made in antiphase with a strong or weak modal coupling (amplitude of movement).

U.S. Pat. No. 5,895,850 discloses a resonant gyroscope including a substrate, a first and second resonant mass vibrating in opposing phase in a preferred direction and a preferred axial rotation, a first and second spring connected to the substrate and to the resonators, where the springs are more flexible in the desired direction of vibration of the resonators. Detection elements enable the Coriolis effect acting on the resonator in a direction perpendicular to the direction of vibration to be measured. A coupling region couples the two vibrating masses, and this region includes a coupling mass and at least one coupling resonator.

Document WO-A-2006/037 928 discloses a resonator with oscillating masses. This is a type of structure enabling a preferential modal coupling in antiphase (i.e. the antiphase mode precedes by several kHz the phase mode), by using a square- or ellipse-shaped network of beams, where this network is held either side by two straight anchored flexbeams. However, the structure remains sensitive to parasitic modes outside the plane.

Other structures known in the art use pivot connections and an antiphase coupling (see, for example, documents US 2004/154 397 and US 2005/072 231). However, these structures do not enable the displacement amplitudes to be adjusted.

In the case of gyroscopes with 2 axes in the plane several studies have been undertaken on specific structures. The first study identified was published in T. Juneau et al., "Dual axis operation of a micromachined rate gyroscope", Transducers, 1997 International Conference on Solid State Sensors and Actuators, vol. 2, 16-19 Jun. 1997, pages 883 to 886. This first study was followed by other studies on discs with oscillating masses. The gyroscope disclosed in the article of T. Juneau et al. has, indeed, the flaw that it is very sensitive to the coupling between transverse axes (excitation and detection directions).

Studies on discs with oscillating masses have given rise to various publications. The following may be noted:
  the article "Decoupled microgyros and the design principle DAVED" by W. Geiger et al., Sensors and Actuators A: Physical, vol. 95, n° 2-3, 2002, pages 239 to 249;
  US 2005/0 210 978;
  the article "Dual-axis microgyroscope with closed-loop detection" by S. An et al., The Eleventh Annual International Workshop on Micro Electro Mechanical Systems, 1998, 25 to 29 Jan. 1998, pages 328 to 333.

In the structures described in these publications there is no mechanical coupling between the different masses. All the movements are controlled by an electrostatic servo-control.

2-axis gyroscopes based on the coupling of diapasons are also known. Such gyroscopes are described, for example, in documents US 2007/0 013 464, WO 2008/021 534, U.S. Pat. No. 5,763,781 and WO 2007/105 211. These gyroscopes are based on a strong coupling of 4 diapasons by the central anchorage connection in excitation mode and in detection mode. If a diapason is excited the other 3 diapasons will vibrate at the same frequency and in phase relative to the excited diapason. This is a movement transmission link. These structures have a common central anchor with the substrate, which causes rotational operation, not translational operation.

U.S. Pat. No. 6,134,961 discloses a one-axis gyroscope including a set of beams (coupling structure) allowing an antiphase coupling between the two detection masses of the gyroscope. The coupling structure has an indirect anchorage to the substrate through beams forming springs. Thus, the coupling structure (called the "quadrilateral loop") is connected to a frame (called the "coupling frame") through springs (called "spring beams") and the frame is anchored, through springs (called "spring beams") to anchors (called "floater anchors").

U.S. Pat. No. 6,349,597 discloses a coupling structure of a rotational rate gyroscope in the plane of the supporting substrate. The coupling structure is anchored through springs in the area of the excitation means. A spring allowing a movement in the detection direction (rotation in axis y) is included in the coupling structure. This configuration makes manufacture of a gyroscope for a detection in axis z quite difficult.

ACCOUNT OF THE INVENTION

The present invention is proposed to improve the gyroscopic devices of the prior art. To this end, a coupling structure is proposed with a closed assembly of beams which can, for example, consist of lozenge-, square- or ellipse-shaped patterns, forming for example a star with several lozenges or ellipses (in the form of a hyperstatic lattice), without anchorage to the substrate, enabling an axial displacement to be transformed into a strong coupling in at least 4 directions, and enabling a natural antiphase movement to be generated which is symmetrical and adjusted in amplitude in respect of at least one pair of masses.

The object of the invention is therefore a coupling structure for a resonant microgyroscope produced on a substrate, where the coupling structure enables a vibratory movement supplied by excitation means along a first axis to be detected, and enables it to be transmitted to seismic masses lying in a plane containing the first axis, characterised in that the coupling structure includes a closed assembly of beams connected to the seismic masses such that they are anchored only to the latter, where the assembly is positioned to detect the vibratory movement provided by the excitation means, and to transmit it to the seismic masses along at least a second axis contained in the said plane, where the coupling structure has no point of anchorage to the substrate.

The gyroscope according to the invention allows a decorrelation between the excitation amplitude and the amplitude of displacement of the masses. In addition, the gyroscope of the invention may be single-axis or multi-axis. The geometry of the coupling structure notably allows a vibration of the masses which is roughly identical in terms of phase and amplitude.

The closed assembly of beams may include at least one closed pattern having a shape chosen from among a lozenge and an ellipse, where the pattern is positioned to detect the vibratory movement along one of the axes of the lozenge or of the ellipse, and to transmit it along the other axis of the lozenge or the ellipse. The vibratory movement may be detected along the large axis of the lozenge or the ellipse, and transmitted along the small axis of the lozenge or the ellipse.

The closed assembly of beams may include at least one closed pattern having a square shape, where the pattern is positioned to detect the vibratory movement along one of the diagonals of the square, and to transmit it along the other diagonal of the square.

The coupling structure may, in order to impart vibration to at least four seismic masses under the effect of four excitation means, include four closed patterns, where the closed patterns are connected by one of their peaks at a point constituting the centre of symmetry of the coupling structure, so as to present patterns which are opposite and aligned two-by-two, with two opposite and aligned patterns being orthogonal to the other two opposite and aligned patterns, and where two consecutive patterns are each intended to be connected by a beam to one of the said masses, such that two opposite seismic masses are located on the same axis passing through the centre of symmetry. The peaks of the patterns opposite the centre of symmetry of the coupling structure may each be coupled securely to an excitation means. The other two seismic masses may be mutually orthogonal, and offset by 45° relative to the opposite and aligned patterns.

If the closed pattern has a lozenge shape, and in order to impart vibration to at least six seismic masses under the effect of at least four excitation means, the coupling structure may include eight juxtaposed lozenge-shaped patterns, where the patterns are connected by one of their peaks at a point constituting the centre of symmetry of the coupling structure, so as to present patterns which are opposite and aligned two-by-two, where the peaks of the patterns opposite the centre of symmetry are each intended to be coupled securely to one of the said six seismic masses.

Another object of the invention is a resonant microgyroscope formed at the surface of a substrate, including at least two seismic masses able to move relative to the substrate, and including excitation means intended to impart vibration to the seismic masses through at least one coupling structure, in which the coupling structure is one of the structures described above.

BRIEF DESCRIPTION OF THE ILLUSTRATIONS

Figure 1B:
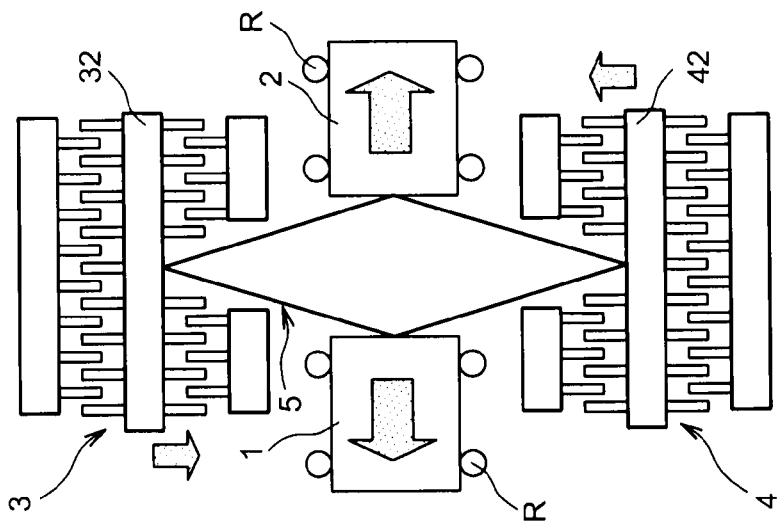
Figure 1A:
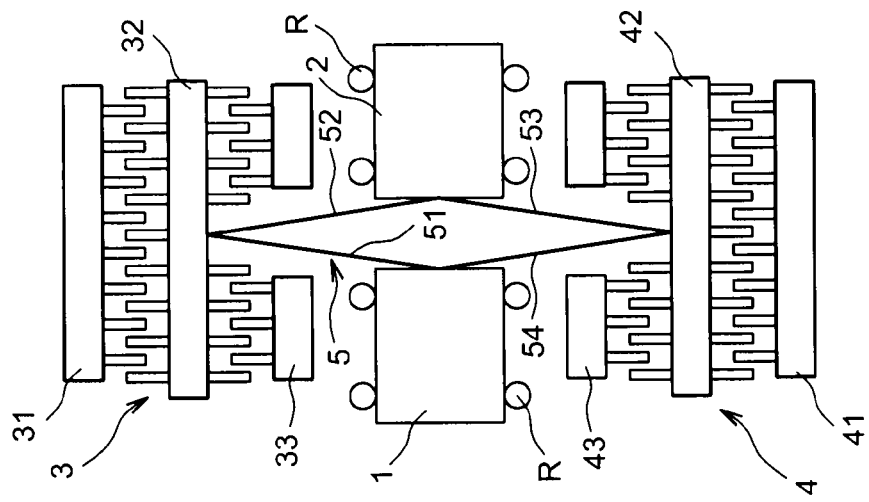
Figure 2:
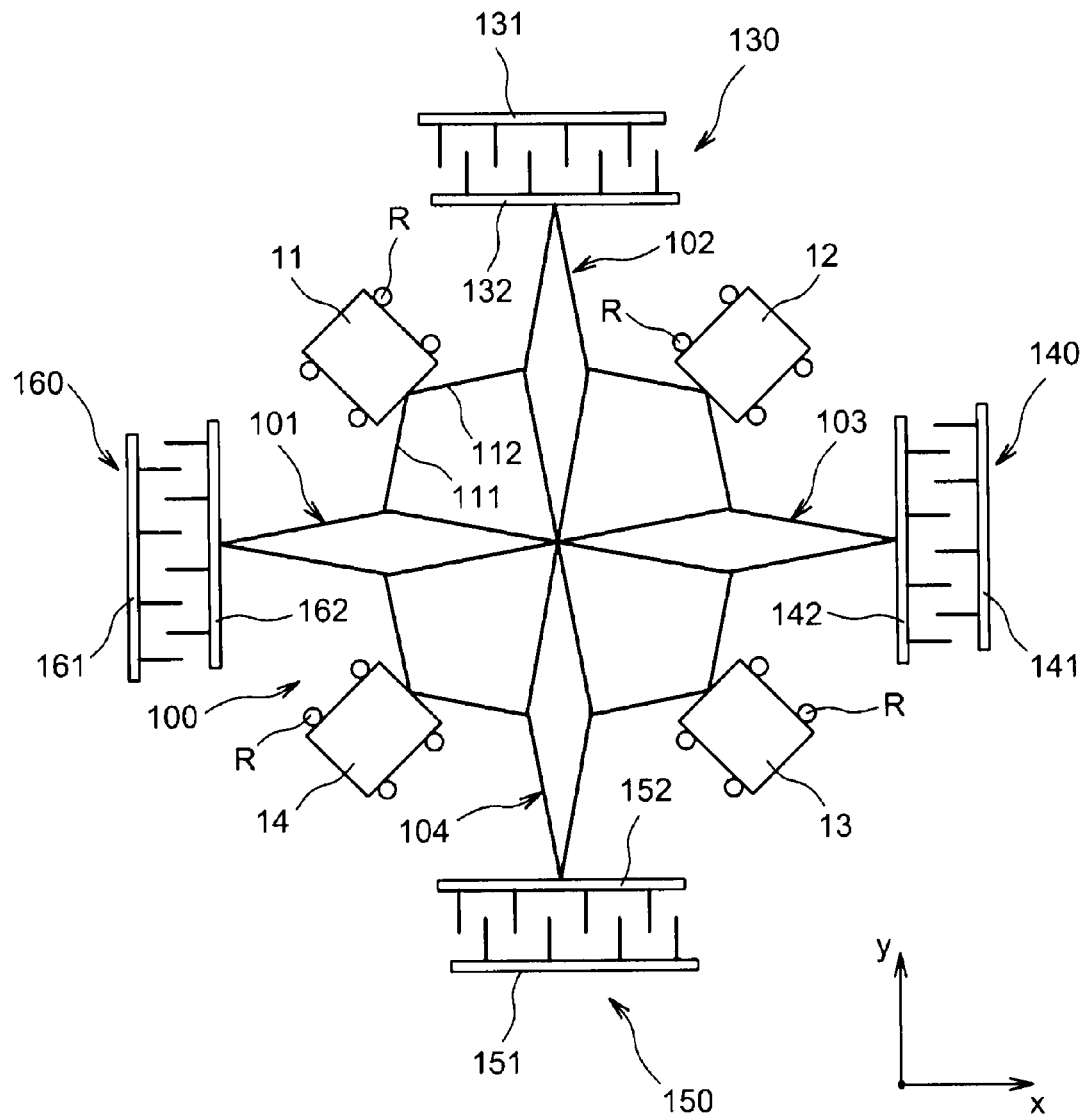
Figure 3A:
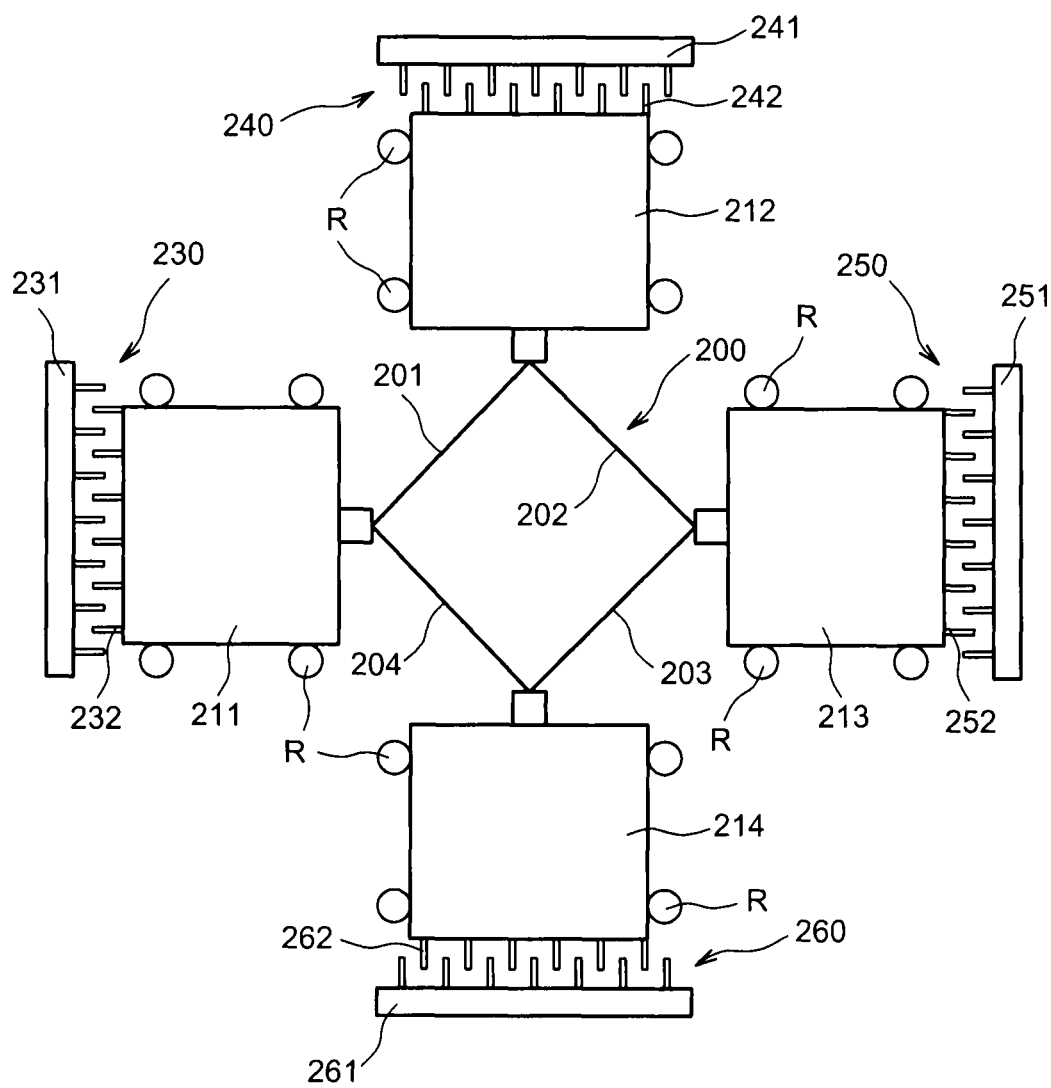
Figure 3B:
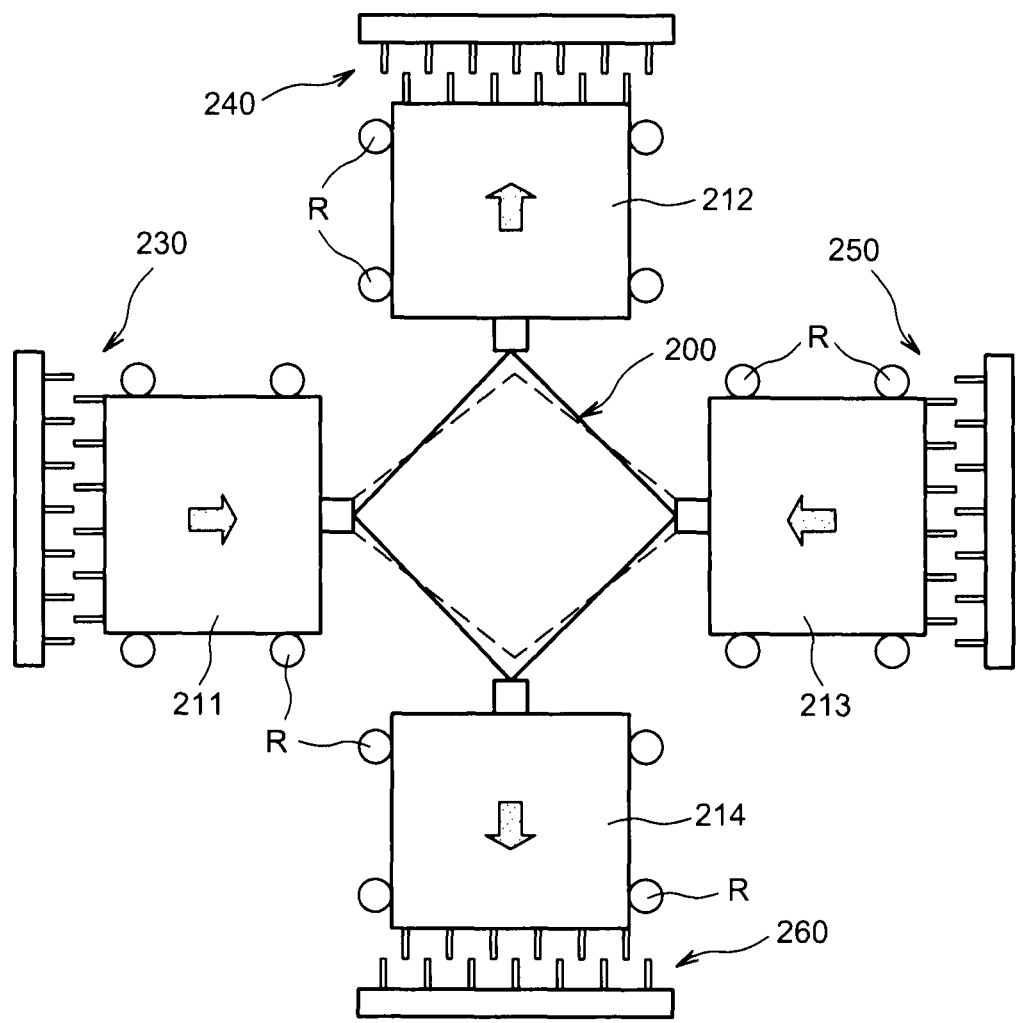
Figure 3C:
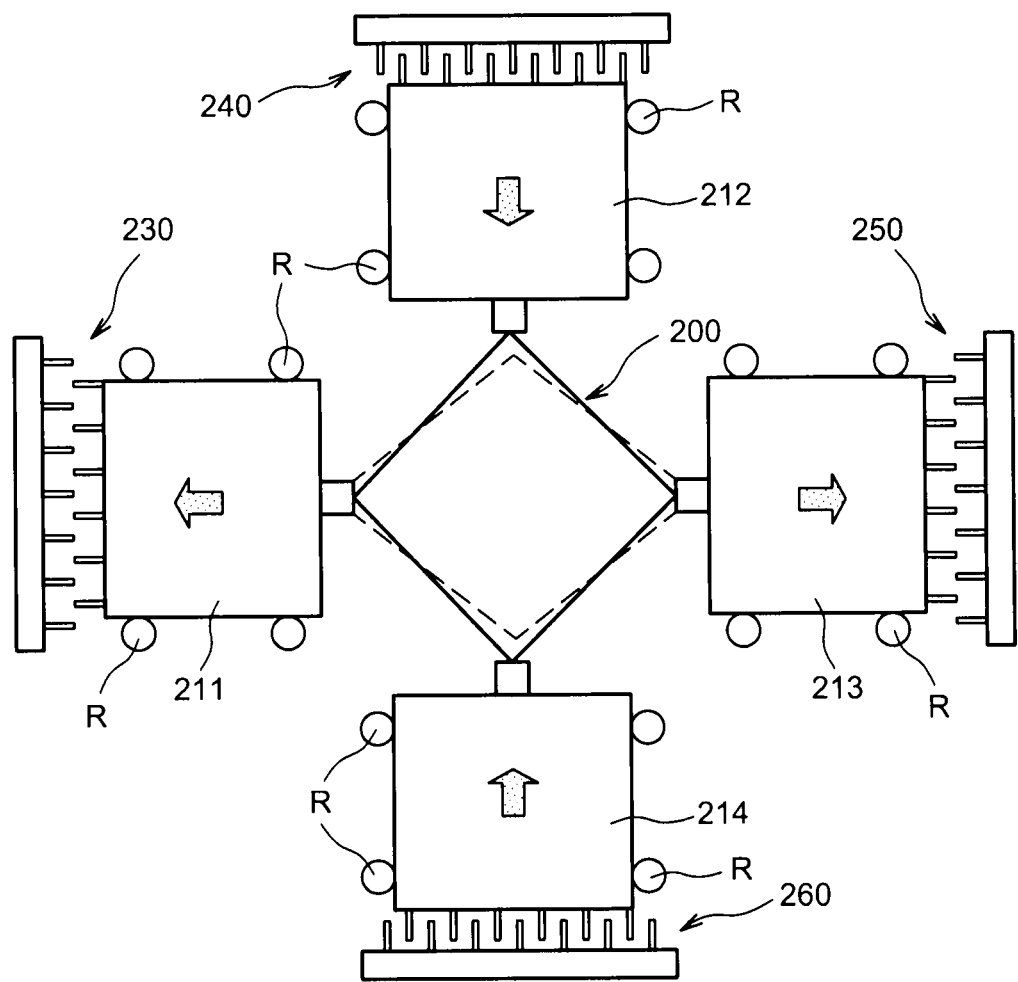
Figure 3A:
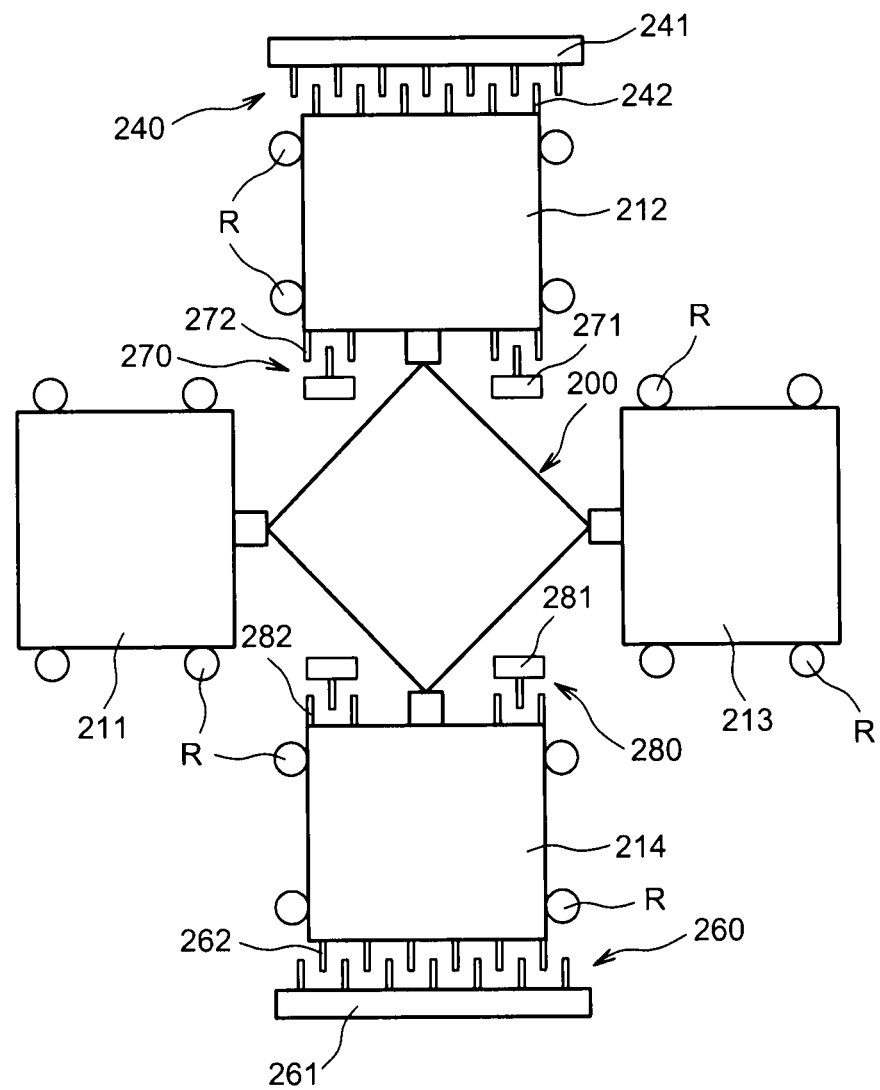
Figure 4:
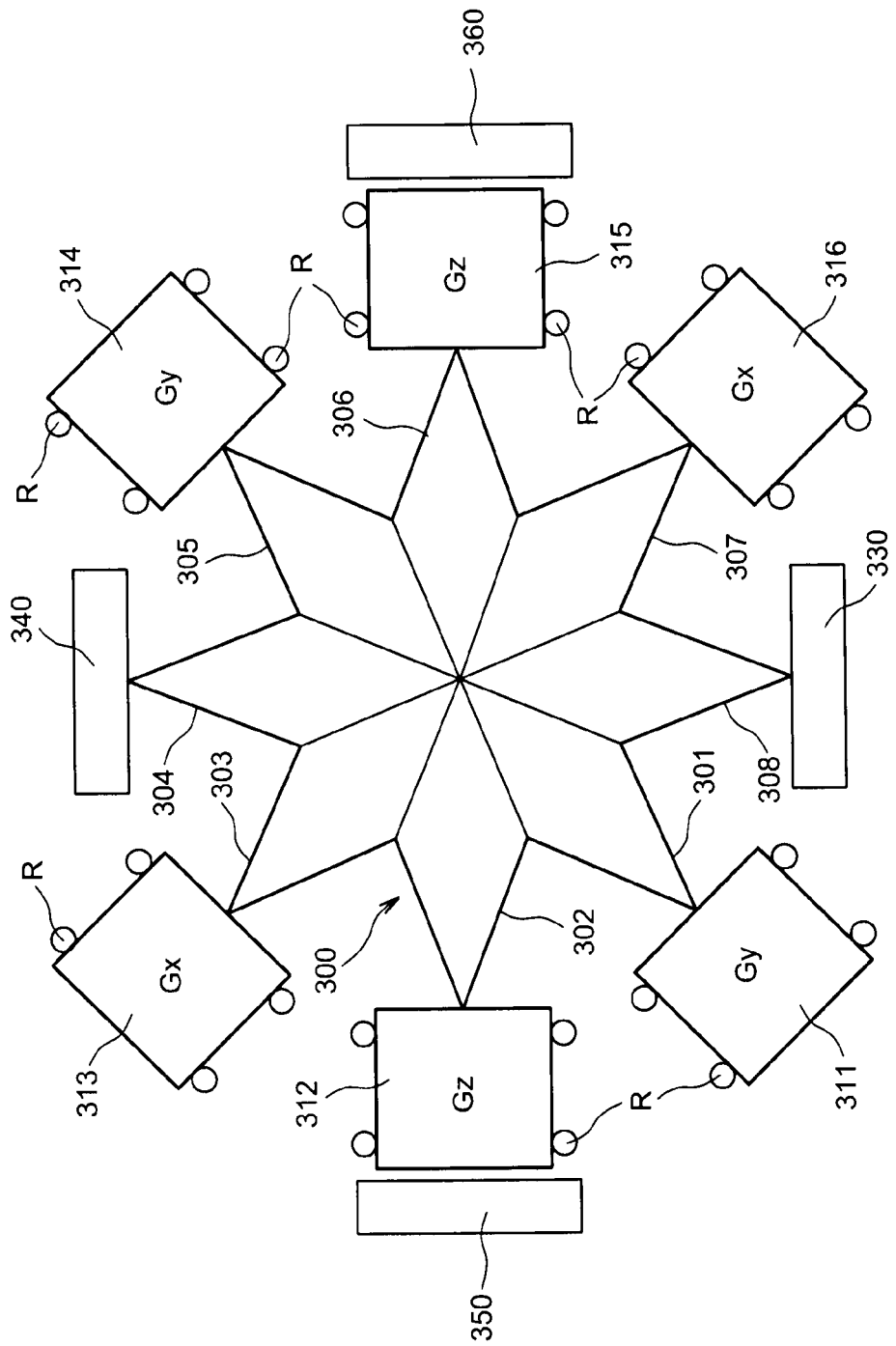
Figure 5:
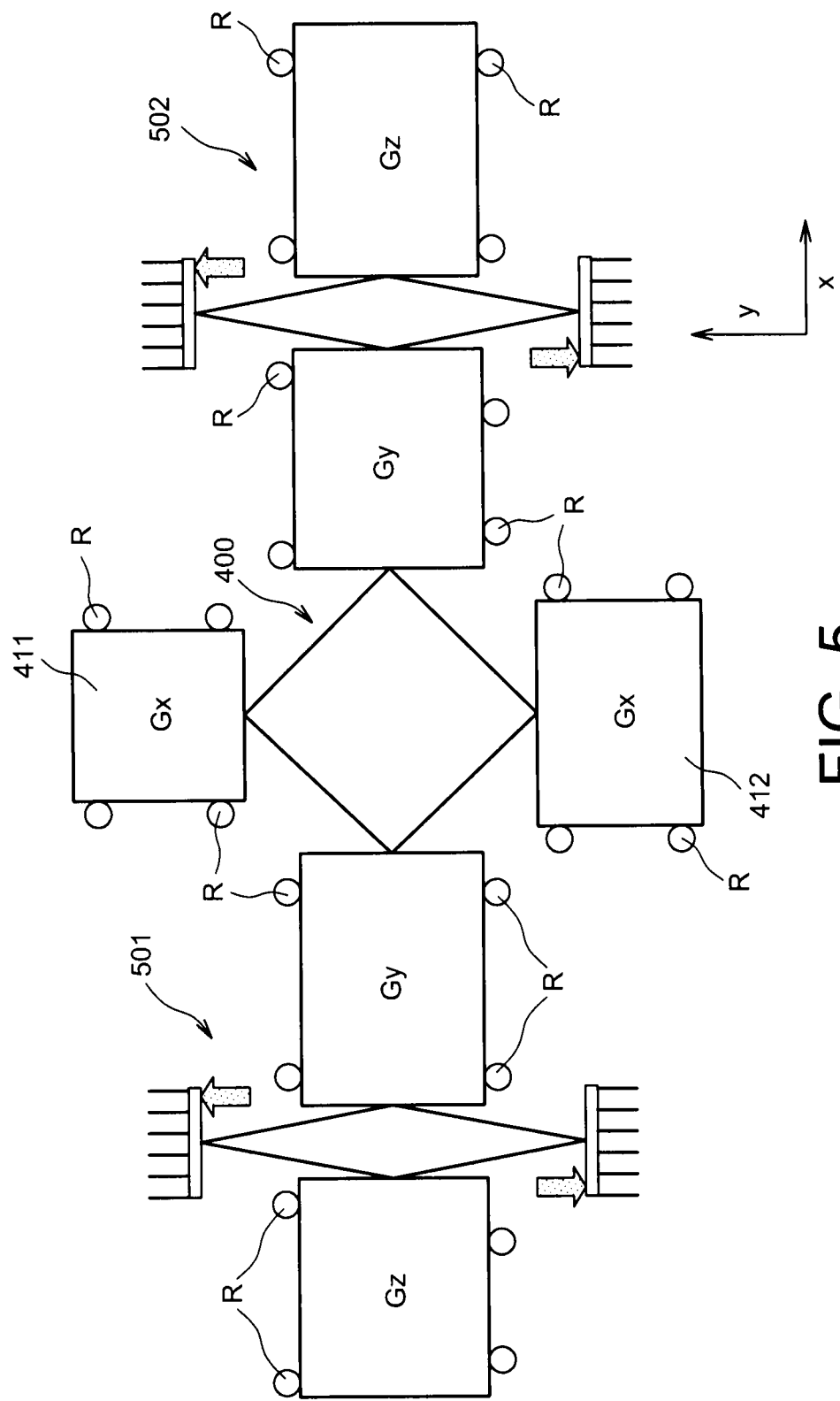

The invention will be better understood and other advantages and features will appear on reading the following description, which is given as a non-restrictive example, accompanied by the appended illustrations, among which:

FIGS. 1A to 1C are schematic diagrams of a one-axis resonant gyroscope according to the present invention, FIG. 2 is a schematic diagram of a two-axis resonant gyroscope, with antiphase coupling with amplified displacement amplitude, according to the invention, FIGS. 3A to 3C are schematic diagrams of a resonant gyroscope with four seismic masses positioned in the same plane, and implementing a symmetrical coupling structure according to the invention, FIG. 3A' is a variant of the resonant gyroscope represented in FIG. 3A, FIG. 4 is a schematic diagram of a resonant gyroscope with six seismic masses positioned in the same plane and implementing a star-shaped coupling structure with six branches according to the invention, FIG. 5 is a schematic diagram of a resonant gyroscope using three coupling structures according to the present invention.

DETAILED ACCOUNT OF PARTICULAR EMBODIMENTS

In all the figures described below, each seismic mass is represented anchored to the substrate by fasteners known to the skilled man in the art. These fasteners, referenced R in the figures, are for example springs. They enable certain displacements of the seismic masses to be limited. The means of actuation (or excitation) of the seismic masses may be of the capacitive comb type, as represented in the appended figures, or of another type known to the skilled man in the art.

FIG. 1A is a schematic diagram of a resonant gyroscope using a coupling structure according to the present invention. The gyroscope includes a first seismic mass 1 and a second seismic mass 2 able to move, along a first axis relative to the supporting substrate, each of them in the direction indicated by arrows in FIGS. 1B and 1C. Seismic masses 1 and 2 have vibration imparted to them due to interdigital capacitive comb structures 3 and 4, as is well known in the art. Comb structure 3 includes two fixed combs 31 and 33 coupled securely to the supporting substrate and a moving comb 32 which is able to move relative to fixed combs 31 and 33. Comb structure 4 includes two fixed combs 41 and 43 coupled securely to the supporting substrate and a moving comb 42 which is able to move relative to fixed combs 41 and 43. Moving combs 32 and 42 move along a second axis relative to the supporting substrate. The first and second axes are mutually orthogonal and parallel to the substrate.

The resonant gyroscope includes a coupling structure 5 formed of four beams 51, 52, 53 and 54 which are positioned end-to-end to constitute a lozenge, one of the axes of which coincides with the axis of displacement of the seismic masses 1 and 2, and the second axis of which coincides with the axis of displacement of the moving combs 32 and 42. Coupling structure 5 is attached by opposite corners of the lozenge to moving combs 32 and 42 and by the other two opposite corners to seismic masses 1 and 2.

FIG. 1A represents the resonant gyroscope in its at rest state. FIG. 1B represents the resonant gyroscope in an excited state such that moving combs 32 and 42 move close to one another. The deformation of coupling structure 5 then forces masses 1 and 2 to separate from one another. FIG. 1C represents the resonant gyroscope in an excited state such that moving combs 32 and 42 separate from one another. The deformation of coupling structure 5 then forces masses 1 and 2 to move close to one another.

Use of a lengthened lozenge enables an adjusted (amplified or reduced) movement to be transmitted, and to guide in antiphase (in an amplified or reduced manner) in the orthogonal direction, by eliminating degrees of freedom. This connection has no point of anchorage. It is this connection which produces the excitation by axial translation of the apices forming an acute angle, for example. This enables a movement to be transmitted which is amplified in the orthogonal direction, which is equal on both sides, and which is adjusted in antiphase with the two masses connected to the two apices forming an obtuse angle, for example.

This enables the actuation of the surface of the masses to be disassociated, and the excitation amplitude generated by a thermal or piezoelectric electrostatic device to be disassociated from the amplitudes of the movements of each of the masses, guaranteeing that the phase and amplitude of the movements of both masses are preserved, whatever the technological disymmetries.

The amplitude of each mass is regulated:
by the overall rigidity of the entire system along the excitation direction, and compared to the mass number,
the force applied to the central link
the system's overall quality coefficient.

The coupling structure represented in FIG. 1 could be ellipse-shaped rather than lozenge-shaped. To this end it is merely necessary to replace each straight beam of the coupling structure by an arched beam.

The use of a square, circular, star, etc., shape for the coupling structure allows production of a two-axis gyroscope in the plane, which is perfectly coupled in excitation mode, to be envisaged. In particular, orthosymmetrical shapes, or shapes with radial symmetry, allow a displacement transmission of the same amplitude in several directions.

The use of a star shape enables production of an inertial matrix which is perfectly coupled in excitation mode to be envisaged. The use of any geometrical shape of this type enables actuation of a system of masses through this coupling link binding the masses to one another to be envisaged. Configuration of the dimensions of these geometrical shapes in an orthotropic manner allows, when movement is imposed in a direction, it to be envisaged to be able to configure the displacement amplitudes generated in the other directions.

Also proposed, according to the present invention, is a gyroscope of the gimbal-structure type, with excitation of four seismic masses at resonance but along two axes, and generation of Coriolis forces in a direction orthogonal to these axes of vibration, and to both axes of rotation, respectively.

An unanchored central connection which may take several shapes (inverted square, circle, star) allows strong coupling of each axisymmetric seismic mass (in antiphase).

If the mass is excited the other 3 will vibrate at the same frequency, the same amplitude and in antiphase relative to the excited mass.

Thus, due to a strong multi-mass coupling for excitation, a single detection unit (by "feedback") of the electronic excitation is required.

Only two masses may be excited, and detection can be accomplished in the other two.

The present invention is differentiated from the state of the art in that it proposes strong coupling of two or more excitation directions of seismic masses with gimbal producing an axisymmetric movement (in phase opposition) by means of an unanchored central link having at least two axes of symmetry. In addition to others, this aspect has the advantage of reducing the number of independent architectures to produce a 3 (6) axes inertial matrix enabling its area, and therefore its manufacturing cost, to be reduced.

On the strong coupling principle, the movement of a mass will be reproduced identically in all the other masses. This enables the number of electronic servo-controls to be reduced, and an excitation amplitude and an equal resonance frequency to be transmitted to all masses according to the following relationship:

$$\omega_0 \sqrt{\frac{\sum m_i}{\sum k_i}}$$

where $m_i$ and $k_i$ represent the respective masses and stiffnesses of each of the masses Whatever the masses $m_i$ and relative stiffness constants $k_i$, if mass or relative stiffness faults are supposed, the summation of all the masses, if this is a replicated structure, enables the impact of the imperfections on the gyroscope's programmed characteristics to be reduced. Amplitude $X_{exc}$ of the movement of the excited mass is:

$$X_{exc} = \frac{Q_{exc} F_{exc}}{k_{exc}}$$

where $Q_{exc}$=quality factor of the excited mass,
$k_{exc}$=stiffness in the excitation direction,
$F_{exc}$=excitation force?
The Coriolis Force $F_{Coriolis}$ transmitted by the excitation movement for all the masses will be differentiated only by the faults of the decoupled detection masses.

$$|F_{Coriolis}| = 2 \cdot m_{deti} \cdot \omega_{exc} \cdot X_{exc}$$

where: $m_{deti}$=mass of each of the detection elements,
$\omega_{exc}$: excitation pulsation.
The variation of sensitivity between the axes becomes dependent solely on the seismic detection mass settings $$S_{mi} = \frac{2 \cdot m_{idet} \cdot Q_{det} \cdot \omega_{exc} \cdot X_{exc}}{k_i}$$

where: $Q_{det}$: quality detection factor,
$k_i$: stiffness of each detection element.
The use of more complex lattice shapes such as an assembly of lozenges of variable dimensions would allow at the same time amplification of the imposed movement and coupling of the movements in opposition of respective phases.

FIG. 2 is a schematic diagram of another resonant gyroscope using a coupling structure according to the present invention. This is a two-axis gyroscope, with antiphase coupling and amplified movement amplitude.

The gyroscope includes two seismic masses 11 and 13 positioned on a first axis parallel to the supporting substrate, and two seismic masses 12 and 14 positioned on a second axis parallel to the supporting substrate and orthogonal to the first axis. Each seismic mass is able to move along the axis on which it is positioned.

Vibration is imparted to the seismic masses by means of interdigital capacitive comb structures 130, 140, 150 and 160. These combs have been represented in simplified fashion in order not to overcomplicate FIG. 2. Comb structure 130 includes a fixed comb 131, which is coupled securely to the supporting substrate, and a moving comb 132 able to move relative to the fixed comb 131. Comb structure 140 includes a fixed comb 141, which is coupled securely to the supporting substrate, and a moving comb 142 able to move relative to the fixed comb 141. Comb structure 150 includes a fixed comb 151, which is coupled securely to the supporting substrate, and a moving comb 152 able to move relative to the fixed comb 151. Comb structure 160 includes a fixed comb 161, which is coupled securely to the supporting substrate, and a moving comb 162 able to move relative to the fixed comb 161.

The resonant gyroscope includes a coupling structure 100 consisting of a complex lattice. This lattice includes four lozenges 101, 102, 103 and 104, each consisting of an assembly of beams as in FIG. 1. Lozenges 101 and 103 are positioned end-to-end and their large axes are aligned. Lozenges 102 and 104 are also positioned end-to-end and their large axes are also aligned. The large axes of lozenges 101 and 103 are orthogonal to the large axes of lozenges 102 and 104. The meeting point of lozenges 101 to 104 constitutes the centre of symmetry of coupling structure 100.

The peaks of lozenges 101, 102, 103 and 104, opposite the centre of symmetry of the coupling structure are coupled securely to the respective moving combs 162, 132, 142 and 152. This comb structure is positioned such that the axis of movement of its moving comb coincides with the large axis of the lozenge which is coupled securely to this moving comb.

The axes of movement of masses 11 to 14 and the axes of excitation of comb structures 130, 140, 150 and 160 are therefore offset by 45°.

Coupling structure 100 includes other beams allowing it to be attached to seismic masses 11 to 14. This attachment is accomplished in a similar fashion for each mass at an identical point of the mass located on its axis of movement. Thus, mass 11 is attached by beams 111 and 112 to the lozenges which are closest to it, i.e. lozenges 101 and 102. This attachment occurs at the apices closest to the lozenges concerned, and which form an obtuse angle.

Gyroscopes have many uses: in the field of motor vehicles, aeronautics, robotics, etc.

As with every product used in the mass retail field such as motor vehicles, in which cost is a major element, mass manufacture of such microelectronic technology components becomes very attractive.

The production of a silicon microgyroscope is already widespread. This type of component typically includes two coupled moving masses, vibrating in the plane at resonance (diapason assembly). The masses are excited by means of electrostatic forces applied through interdigital comb structures.

If it is accepted that the masses vibrate in axis x, when the gyroscope rotates at a certain angular speed around axis y (orthogonal to axis x), the composition of the forced vibration with the angular speed induces forces (Coriolis forces) which impart vibration in z to the moving masses. The vibration is then detected by capacitive means by electrodes positioned above the moving masses, and enables the value of the rotational speed around axis y to be derived.

The coupling structure of FIG. 2 uses lozenges. These lozenges may, according to the present invention, be replaced by ellipses, provided the coupling structure remains symmetrical.

FIGS. 3A to 3C are schematic diagrams of a resonant gyroscope with four seismic masses positioned in the same plane, and implementing a symmetrical coupling structure.

FIG. 3A represents the resonant gyroscope in its at rest state. The gyroscope includes two seismic masses 211 and 213 positioned on a first axis parallel to the supporting substrate, and two seismic masses 212 and 214 positioned on a second axis parallel to the supporting substrate and orthogonal to the first axis. Each seismic mass is able to move along the axis on which it is positioned.

Vibration is imparted to the seismic masses by means of interdigital capacitive comb structures 230, 240, 250 and 260. Comb structure 230 includes a fixed comb 231, which is coupled securely to the supporting substrate, and a comb 232 which is coupled securely to mass 211. Comb structure 240 includes a fixed comb 241, which is coupled securely to the supporting substrate, and a comb 242 which is coupled securely to mass 212. Comb structure 250 includes a fixed comb 251, which is coupled securely to the supporting substrate, and a comb 252 which is coupled securely to mass 213. Comb structure 260 includes a fixed comb 261, which is coupled securely to the supporting substrate, and a comb 262 which is coupled securely to mass 214.

The resonant gyroscope includes a coupling structure 200 having the shape of a square rotated by 45°. The square forming the coupling structure includes a beam 201 connecting masses 211 and 212, a beam 202 connecting masses 212 and 213, a beam 203 connecting masses 213 and 214 and a beam 204 connecting masses 214 and 211.

FIGS. 3B and 3C represent the resonant gyroscope when an excitation signal is transmitted to interdigital comb structures 230 and 250, for example. Coupling structure 200 is then deformed: it is transformed from a square into a lozenge.

FIG. 3B represents a state in which masses 211 and 213 are separated from one another. In this case, masses 212 and 214 come close to one another. Coupling structure 200 forms a lozenge the large axis of which is equal to the axis of masses 211 and 213, and the small axis of which is equal to the axis of masses 212 and 214. Coupling structure 200 is represented with solid lines in its deformed state, and with broken lines in its non-deformed state, i.e. when at rest.

FIG. 3C represents a state in which masses 211 and 213 come close to one another. In this case, masses 212 and 214 are separated from one another. Coupling structure 200 forms a lozenge the large axis of which is equal to the axis of masses 212 and 214, and the small axis of which is equal to the axis of masses 211 and 213. Coupling structure 200 is represented with solid lines in its deformed state, and with broken lines in its non-deformed state, i.e. when at rest.

FIG. 3A' is a variant of the resonant gyroscope represented in FIG. 3A. The elements of this gyroscope which are identical to those of FIG. 3A are referenced identically. The two pairs of masses of this gyroscope are represented when at rest. In this variant a single pair of masses is excited: masses 212 and 214. Compared to the diagram of FIG. 3A, masse 212 is also excited by capacitive comb structure 270, and mass 214 is also excited by capacitive comb structure 280. Structure 270 includes a fixed comb 271, which is coupled securely to the supporting substrate, and a comb 272 which is coupled securely to mass 212. Structure 280 includes a fixed comb 281, which is coupled securely to the supporting substrate, and a comb 282 which is coupled securely to mass 214.

FIG. 4 is a schematic diagram of a resonant gyroscope with six seismic masses positioned in the same plane and implementing a star-shaped coupling structure with eight branches according to the invention.

Coupling structure 300 consists of beams assembled to obtain eight identical lozenges 301 to 308, which are juxtaposed and have a common peak constituting the centre of symmetry of the coupling structure. Each of the peaks of a first group of three juxtaposed lozenges 301, 302 and 303, where these peaks are opposite the centre of symmetry of the coupling structure, is coupled securely to a seismic mass 311, 312 and 313, respectively. Each of the peaks of a second group of three juxtaposed lozenges 305, 306 and 307, where these peaks are opposite the centre of symmetry of the coupling structure, is coupled securely to a seismic mass 314, 315 and 316, respectively.

Both groups of juxtaposed lozenges are symmetrical relative to the centre of symmetry of coupling structure 300.

In FIG. 4, the actuation devices are represented by rectangles. They are, for example, capacitive comb structures. The gyroscope includes four actuation devices 330, 340, 350 and 360. Actuation devices 330 and 340 act respectively on the opposite peaks of lozenges 308 and 304. They are aligned along a straight line passing through the centre of symmetry of the coupling structure. Actuation devices 350 and 360 act respectively on the opposite peaks of lozenges 302 and 306 through, respectively, masses 312 and 315. They are aligned along a straight line passing through the centre of symmetry of the coupling structure, and perpendicular to the straight line along which are aligned actuation devices 330 and 340.

Each seismic mass enables a vibratory movement to be detected in one of the directions x, y or z, as indicated in FIG. 4.

FIG. 5 is a schematic diagram of a resonant gyroscope using three coupling structures according to the invention.

In this figure there is a first coupling structure 400 consisting of beams and having the shape of a square rotated by 45° in the at rest state. A first diagonal of the square forming coupling structure 400 constitutes a first axis x for the gyroscope, while a second diagonal of the square forming coupling structure 400 constitutes a second axis y for the gyroscope, orthogonal to the first axis.

Coupling structure 400 couples, along axis x, two devices 501, 502 such as the one represented in FIG. 1A. To this end, coupling structure 400 is coupled securely, by a first peak of the square positioned on axis x, to one of the two masses of a first device such as the one represented in FIG. 1A. Coupling structure 400 is also coupled securely, by a second peak of the square positioned on axis x, to one of the two masses of a second device such as the one represented in FIG. 1A.

Coupling structure 400 also couples two seismic masses 411 and 412 along axis y. To this end, coupling structure 400 is coupled securely, by a first peak of the square positioned along axis y, to seismic mass 411. Coupling structure 400 is also coupled securely, by a second peak of the square positioned along axis y, to seismic mass 412.

Such a microgyroscope having the coupling structure according to the invention may be produced on an SOI substrate using techniques known to the skilled man in the art.

Other embodiment variants are possible. A coupling structure in the form of an eight-branch star, constituting a lattice, enables an amplification of the movements in four directions of space at the same time as production of a two-axis gyroscope, on the same principle as previously described, to be envisaged. However, the excitation must be controlled in relation to four branches, but requires no central anchor.

A coupling structure having a star with at least six branches enables a coupling to be produced in at least six directions; however the facing masses are in phases.

The invention claimed is:

1. A coupling structure for a resonant microgyroscope produced on a substrate, wherein the coupling structure enables a vibratory movement supplied by an actuator along a first axis to be detected, and enables it to be transmitted to seismic masses lying in a plane containing the first axis, the coupling structure comprising:
    a closed assembly of beams connected to the seismic masses such that they are anchored only to the seismic masses,
    wherein the assembly is positioned to detect the vibratory movement provided by the actuator, and to transmit it to the seismic masses along at least a second axis contained in the plane, and
    wherein the coupling structure has no point of anchorage to the substrate.

2. A coupling structure according to claim 1, in which the closed assembly of beams includes at least one closed pattern having a shape chosen from among a lozenge and an ellipse, wherein the pattern is positioned to detect the vibratory movement along one of the axes of the lozenge or of the ellipse, and to transmit the vibratory movement along the other axis of the lozenge or the ellipse.

3. A coupling structure according to claim 2, in which the vibratory movement is detected along the large axis of the lozenge or the ellipse, and transmitted along the small axis of the lozenge or the ellipse.

4. A coupling structure according to claim 1, in which the assembly formed of beams includes at least one square-shaped closed pattern, wherein the pattern is positioned to detect the vibratory movement along one of diagonals of the square, and to transmit the vibratory movement along the other diagonal of the square.

5. A coupling structure for a resonant microgyroscope produced on a substrate, wherein the coupling structure enables a vibratory movement supplied by an actuator along a first axis to be detected, and enables it to be transmitted to seismic masses lying in a plane containing the first axis, the coupling structure comprising:
    a closed assembly of beams connected to the seismic masses,
    wherein the assembly is positioned to detect the vibratory movement provided by the actuator, and to transmit it to the seismic masses along at least a second axis contained in the plane,
    wherein the coupling structure has no point of anchorage to the substrate,
    wherein the closed assembly of beams includes four closed patterns, each of the closed patterns having a shape chosen from among a lozenge and an ellipse, wherein the pattern is positioned to detect the vibrator movement along one of the axes of the lozenge or of the ellipse, and to transmit the vibratory movement along the other axis of the lozenge or the ellipse, or each of the closed patterns having a square shape, wherein the pattern is positioned to detect the vibratory movement along one of diagonals of the square, and to transmit the vibratory movement along the other diagonal of the square shape,
    wherein the coupling structure imparts vibration to at least four seismic masses under effect of four actuators, wherein the closed patterns are connected by one of their peaks at a point constituting a center of symmetry of the coupling structure, so as to present patterns that are opposite and aligned two-by-two, wherein two opposite and aligned patterns are orthogonal to the other two opposite and aligned patterns, and wherein two consecutive patterns are each configured to be connected by a beam to one of the masses, such that two opposite seismic masses are located on a same axis passing through the center of symmetry.

6. A coupling structure according to claim 5, in which each of the peaks of the patterns opposite the center of symmetry of the coupling structure is coupled securely to one of the four actuators.

7. A coupling structure according to claim 5, in which both axes of the seismic masses are mutually orthogonal, and offset by 45° relative to the opposite and aligned patterns.

8. A coupling structure for a resonant microgyroscope produced on a substrate, wherein the coupling structure enables a vibratory movement supplied by an actuator along a first axis to be detected, and enables it to be transmitted to seismic masses lying in a plane containing the first axis, the coupling structure comprising:

a closed assembly of beams connected to the seismic masses, wherein the assembly is positioned to detect the vibratory movement provided by the actuator, and to transmit it to the seismic masses along at least a second axis contained in the plane, wherein the coupling structure has no point of anchorage to the substrate, wherein the closed assembly of beams includes eight juxtaposed closed patterns, each of the closed patterns having a lozenge shape, wherein the pattern is positioned to detect the vibratory movement along one of the axes of the lozenge, and to transmit the vibratory movement along the other axis of the lozenge, wherein the closed patterns impart vibration to at least six seismic masses under effect of at least four actuators, wherein the patterns are connected by one of their peaks at a point constituting a center of symmetry of the coupling structure, so as to present patterns that are opposite and aligned two-by-two, and wherein the peaks of the patterns opposite the center of symmetry are each configured to be coupled securely to one of the six seismic masses.

9. A resonant microgyroscope formed at a surface of a substrate, comprising:

at least two seismic masses configured to move relative to the substrate;

an actuator configured to impart vibration to the seismic masses through at least one coupling structure, wherein the coupling structure includes
  a closed assembly of beams connected to the seismic masses such that they are anchored only to the seismic masses,
  wherein the assembly is positioned to detect the vibratory movement provided by the actuator, and to transmit it to the seismic masses along at least a second axis contained in the plane, and
  wherein the coupling structure has no point of anchorage to the substrate.

10. The resonant microgyroscope of claim 9, wherein the actuator includes interdigital comb structures.

\* \* \* \* \*